US008088268B2

(12) United States Patent
Kim et al.

(10) Patent No.: US 8,088,268 B2
(45) Date of Patent: Jan. 3, 2012

(54) METHOD OF FABRICATING MASK FOR FORMING WOOD GRAIN PATTERNS

(75) Inventors: Min Su Kim, Ulsan (KR); Jong Seo Park, Gyeongsangnam-do (KR)

(73) Assignees: Hyundai Motor Company, Seoul (KR); Moltex-Yangsan Co., Ltd., Gyeongsangnam-do (KR)

( * ) Notice: Subject to any disclaimer, the term of this patent is extended or adjusted under 35 U.S.C. 154(b) by 603 days.

(21) Appl. No.: 12/268,022

(22) Filed: Nov. 10, 2008

(65) Prior Publication Data

US 2009/0155482 A1 Jun. 18, 2009

(30) Foreign Application Priority Data

Dec. 13, 2007 (KR) ........................ 10-2007-0129819

(51) Int. Cl.
*C25D 1/00* (2006.01)
*B23P 15/00* (2006.01)
*B29C 33/40* (2006.01)

(52) U.S. Cl. ............................ 205/67; 264/219; 216/39

(58) Field of Classification Search .................... 205/70; 264/219; 216/39

See application file for complete search history.

(56) References Cited

U.S. PATENT DOCUMENTS

| | | | | |
|---|---|---|---|---|
| 2,830,899 | A * | 4/1958 | Brown | 430/274.1 |
| 7,105,280 | B1 * | 9/2006 | Deeman et al. | 430/320 |
| 7,323,093 | B2 * | 1/2008 | Naito et al. | 205/67 |
| 2002/0100691 | A1 * | 8/2002 | Bonivert et al. | 205/70 |
| 2004/0174596 | A1 * | 9/2004 | Umeki | 359/484 |
| 2006/0138695 | A1 * | 6/2006 | Lee | 264/219 |

FOREIGN PATENT DOCUMENTS

| | | |
|---|---|---|
| JP | 61-269995 | 11/1986 |
| JP | 07-100840 | 4/1995 |
| JP | 07-118890 | 5/1995 |
| JP | 07-148844 | 6/1995 |
| JP | 07-214569 | 8/1995 |
| JP | 2007-050645 | 3/2007 |
| KR | 1998-0000979 | 3/1998 |
| KR | 10-0561705 A | 12/2005 |

* cited by examiner

*Primary Examiner* — Luan Van

(74) *Attorney, Agent, or Firm* — Edwards Wildman Palmer LLP; Peter F. Corless

(57) ABSTRACT

The present invention provides a method of fabricating a mask for forming wood grain patterns, the method comprising: subjecting a metal plate to an etching process to process a selected pattern on the metal plate; producing a pattern sheet using the etched metal plate an a flexible sheet; attaching the produced pattern sheet to the surface of a product; and subjecting the product to an electroforming process to thereby fabricate the mask. With the method, the time and cost for production of the mask can be remarkably reduced.

13 Claims, 7 Drawing Sheets

METHOD OF FABRICATING MASK FOR FORMING WOOD GRAIN PATTERNS

CROSS-REFERENCE TO RELATED APPLICATION

This application claims the benefit under 35 U.S.C. §119(a) of Korean Patent Application No. 10-2007-129819 filed on Dec. 13, 2007, the entire contents of which are incorporated herein by reference.

BACKGROUND (a) Technical Field

The present invention relates to a method of fabricating a mask for forming wood grain patterns. More particularly, the present invention relates to a method of fabricating a mask in which the mask is processed to effectively shape elaborate patterns, logos or the like on a stereoscopic object so as to express images with natural and beautiful textures and colors on the surface of the stereoscopic object to thereby remarkably shorten the production time of the mask, and elaborate and natural patterns such as wood grains are shaped on the stereoscopic object at low cost.

(b) Background Art

Conventionally, various process methods have been performed to form patterns on a plastic plate, an iron plate, an aluminum plate, stainless steel plate and the like.

For example, such process methods are largely classified into a method in which printing is performed on a film and a transfer process using water is performed, an injection method in which printing is performed on a film sheet to shape a pattern on the film sheet, a method in which after printing has been performed on a film sheet and an adhesive has been coated on the film sheet, the adhesive-coated film sheet is attached to a product, and a method in which an ink is floated on water to form a pattern.

These methods entail problems in that the cost is increased due to the import of transfer films, a lot of facilities, environmental pollutions, occurrence of defectives, etc., making mass-production difficult.

In addition, as shown in FIG. 7, a method of shaping a pattern on a conventional product is problematic in that since its entire process is carried out manually, high labor cost and lots of processes are additionally required.

The information disclosed in this Background section is only for enhancement of understanding of the background of the invention and should not be taken as an acknowledgment or any form of suggestion that this information forms the prior art that is already known to a person skilled in that art.

SUMMARY OF THE DISCLOSURE

The present invention has been made in an effort to solve the above problems occurring in the prior art, and it is an object of the present invention to provide a method of fabricating a mask which allows a pattern sheet with a pattern which a user wants to have to be made through an etching process, and also allows elaborate and natural patterns to be transferred on a stereoscopic object through an electroforming process.

In order to accomplish the above object, in one aspect, the present invention provides a method of fabricating a mask for forming wood grain patterns, which comprises the steps of: subjecting a metal plate to an etching process to process a selected pattern on the metal plate; producing a pattern sheet using the etched metal plate an a flexible sheet; attaching the produced pattern sheet to the surface of a product; and subjecting the product to an electroforming process to thereby fabricate the mask.

Preferably, the metal plate is etched by 0.12-3.5 mm. The flexible sheet may have, preferably, a thickness of 0.15-5.0 mm. Suitably, the flexible sheet is made of at least one selected from the group consisting of PVC, polyurethane and silicone. Also suitably, the produced pattern sheet has a thickness of 0.12-3.5 mm. The mask is fabricated to have a thickness of, preferably, 0.15 mm or greater.

In a preferred embodiment, the etching process comprises the steps of: subjecting the metal plate to a resist coating to form a coating layer; attaching a film shaped according to the selected pattern to the top surface of the coating layer formed on the metal plate; irradiating an ultraviolet (UV) ray to the metal plate with the film attached thereto; immersing the metal plate into an etching solution to etch the immersed metal plate; and sanding the etched metal plate.

In another preferred embodiment, the step of producing the pattern sheet comprises pressing the flexible sheet on the metal plate etched according to the selected pattern in the etching process to thereby produce the pattern sheet.

In still another preferred embodiment, the electroforming process comprises the steps of: attaching the produced pattern sheet to the surface of the product; subjecting the attached pattern sheet to an electrical conduction treatment; polishing the top end portion of the electrical conduction-treated pattern sheet and performing a release coating on the polished pattern sheet; performing a masking on the remaining surface except the surface of the product to which the pattern sheet is attached; subjecting the masked product to an electroforming to form an electrodeposited layer on the surface of the electrical conduction-treated pattern sheet; and removing the electrodeposited layer from the electrical conduction-treated pattern sheet to form an electroforming jig.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like. The present systems will be particularly useful with a wide variety of motor vehicles.

The above and other aspects of the invention are discussed infra.

DETAILED DESCRIPTION

Figure 1:
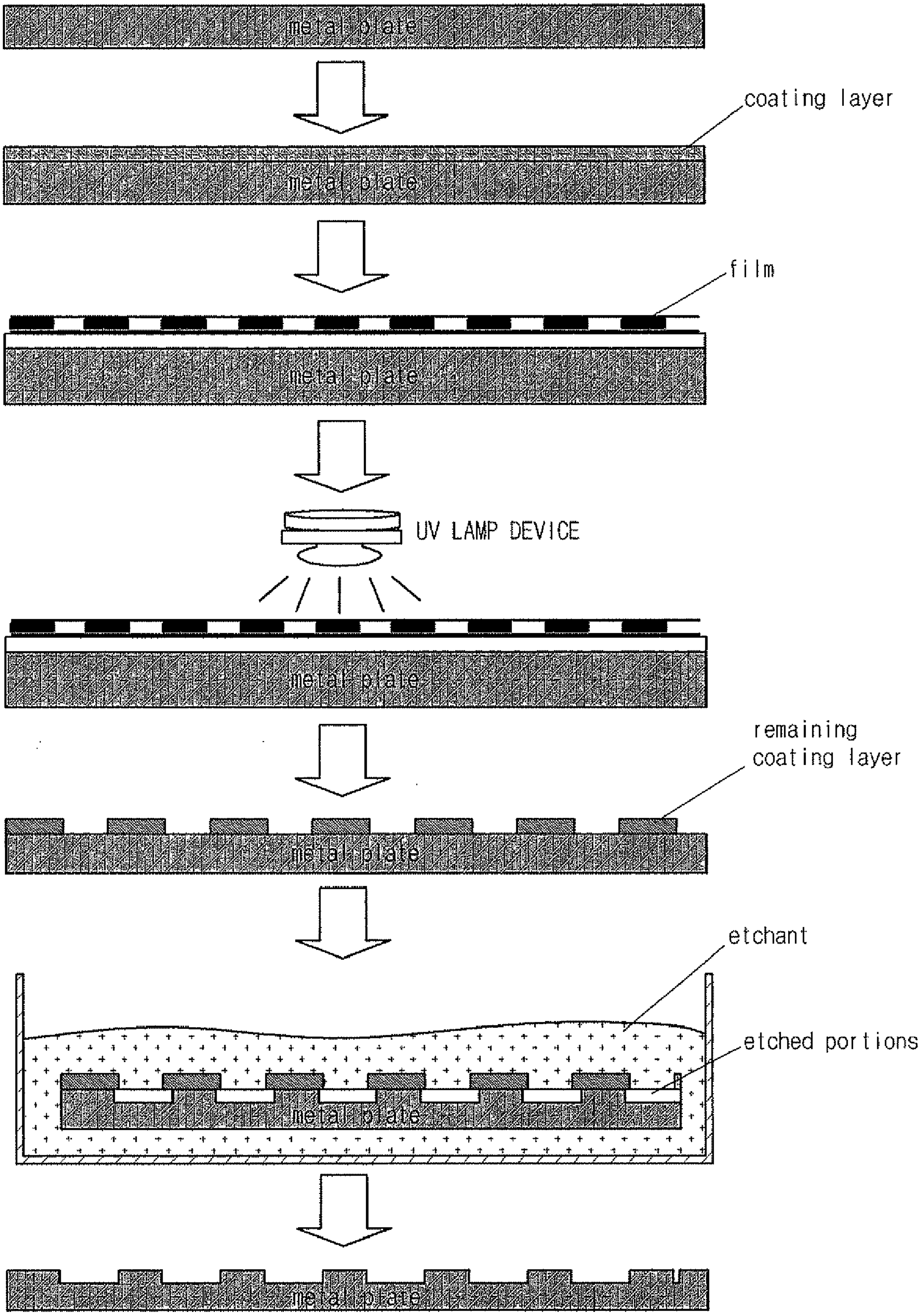
FIG. 1 is a process flow view showing an etching process in a method of fabricating a mask for forming wood grain patterns in accordance with the present invention.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

The typical description or the redundant description on a conventional technique and an identical portion can be omitted. The above and other objects, features and advantages of the present invention will be more understood from the following detailed description of the preferred embodiments of the invention.

Figure 2:
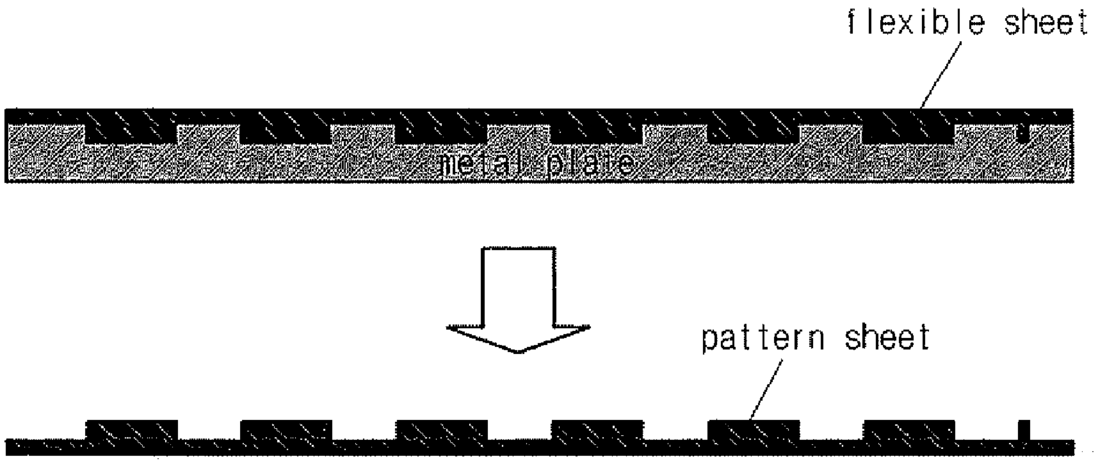
FIG. 2 is a process flow view showing a pattern sheet forming process in a method of fabricating a mask for forming wood grain patterns in accordance with the present invention.
Figure 3:
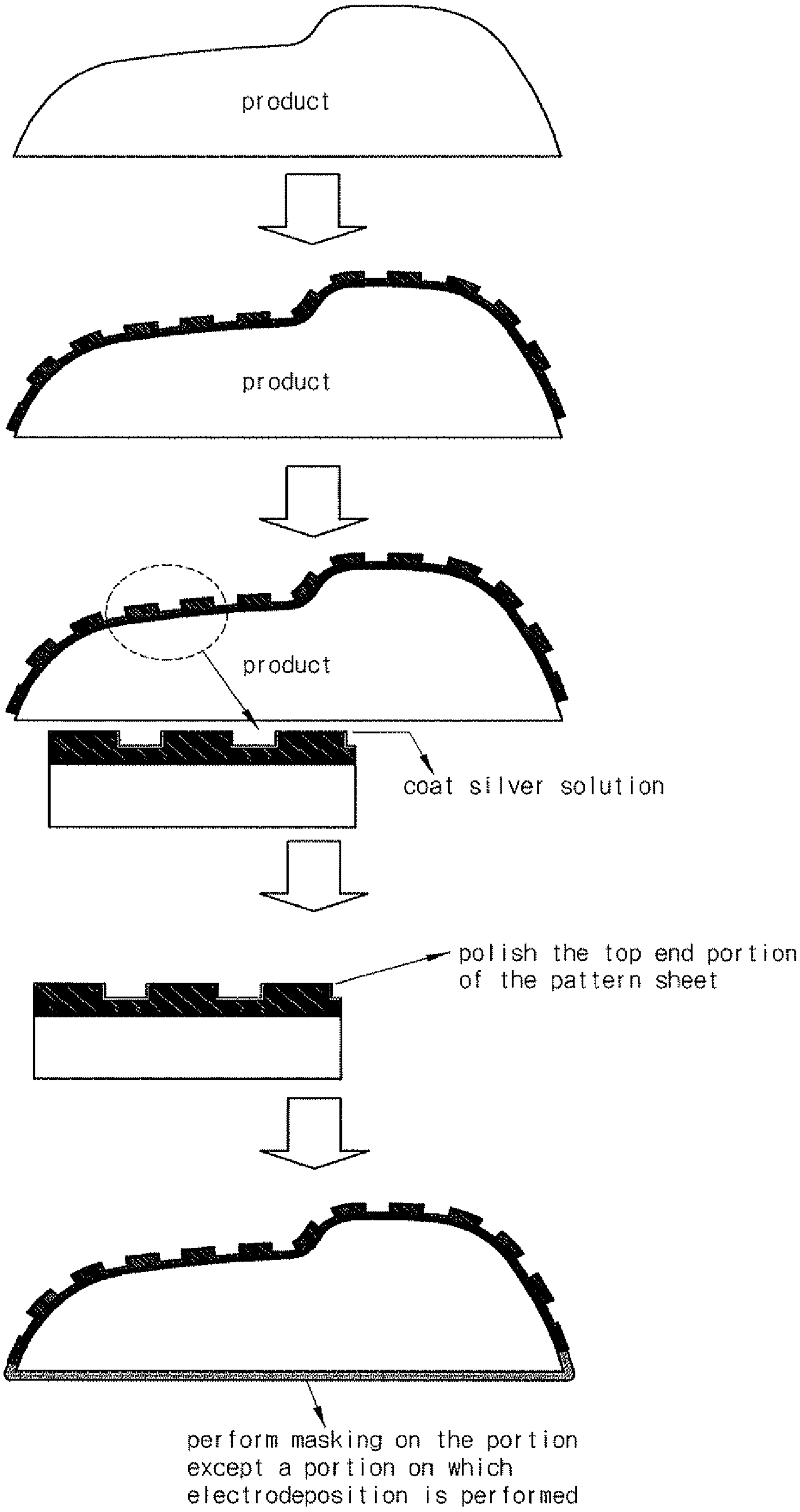
FIG. 3 is a process flow view showing a part of an electroforming process in a method of fabricating a mask for forming wood grain patterns in accordance with the present invention.
Figure 4:
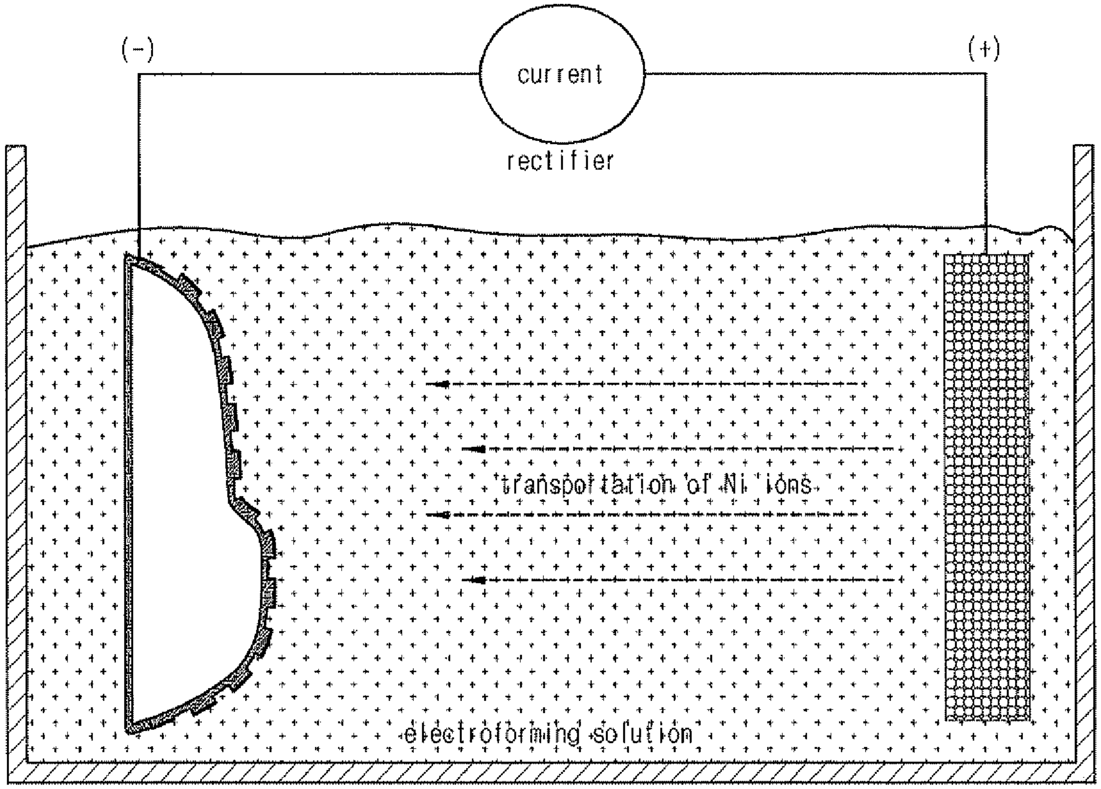
FIG. 4 is a process flow view showing a part of an electroforming process following the part of FIG. 3 in accordance with the present invention.
Figure 5:
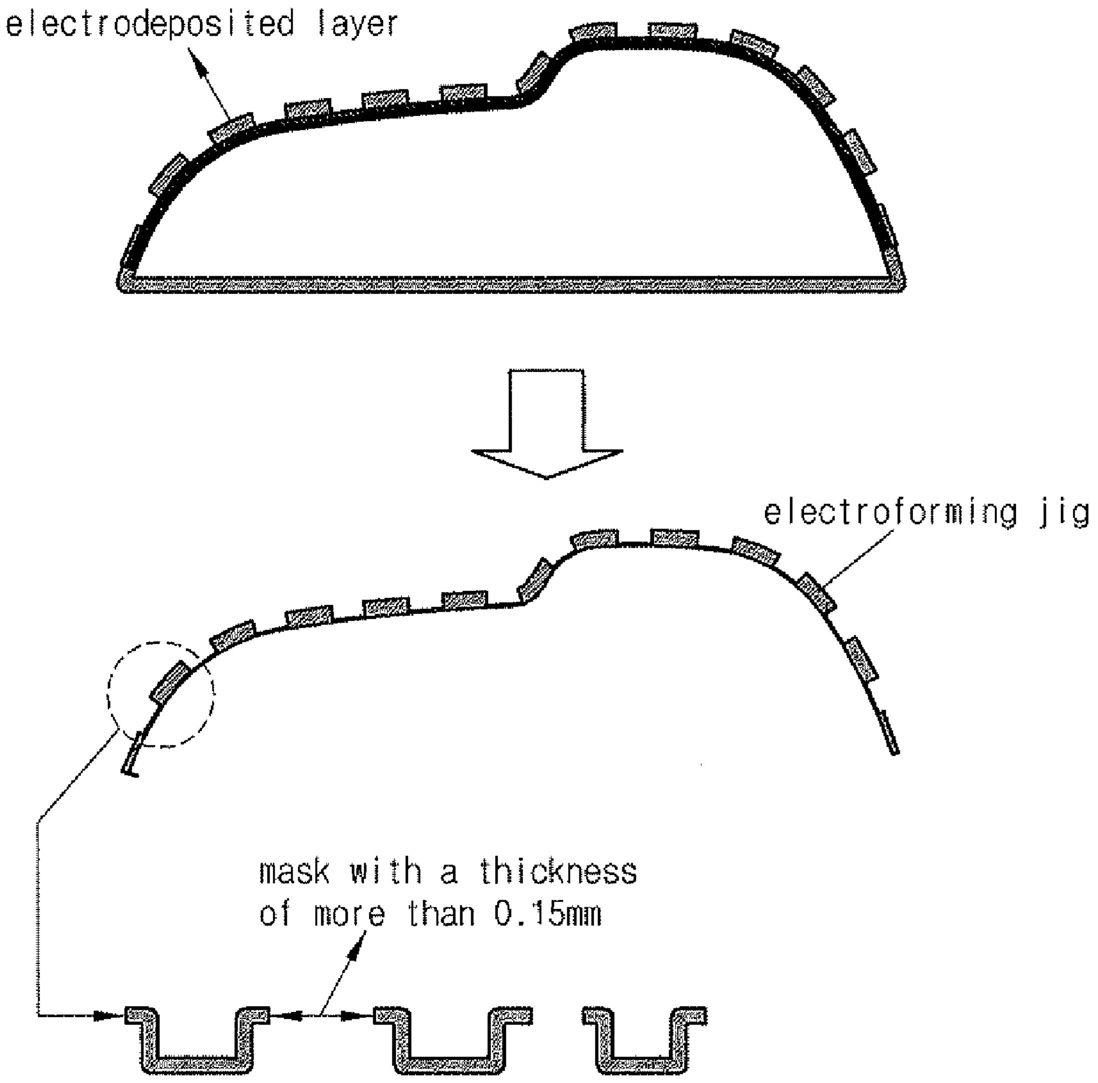
FIG. 5 is a process flow view showing a part of an electroforming process following the part of FIG. 4 in accordance with the present invention.
Figure 6:
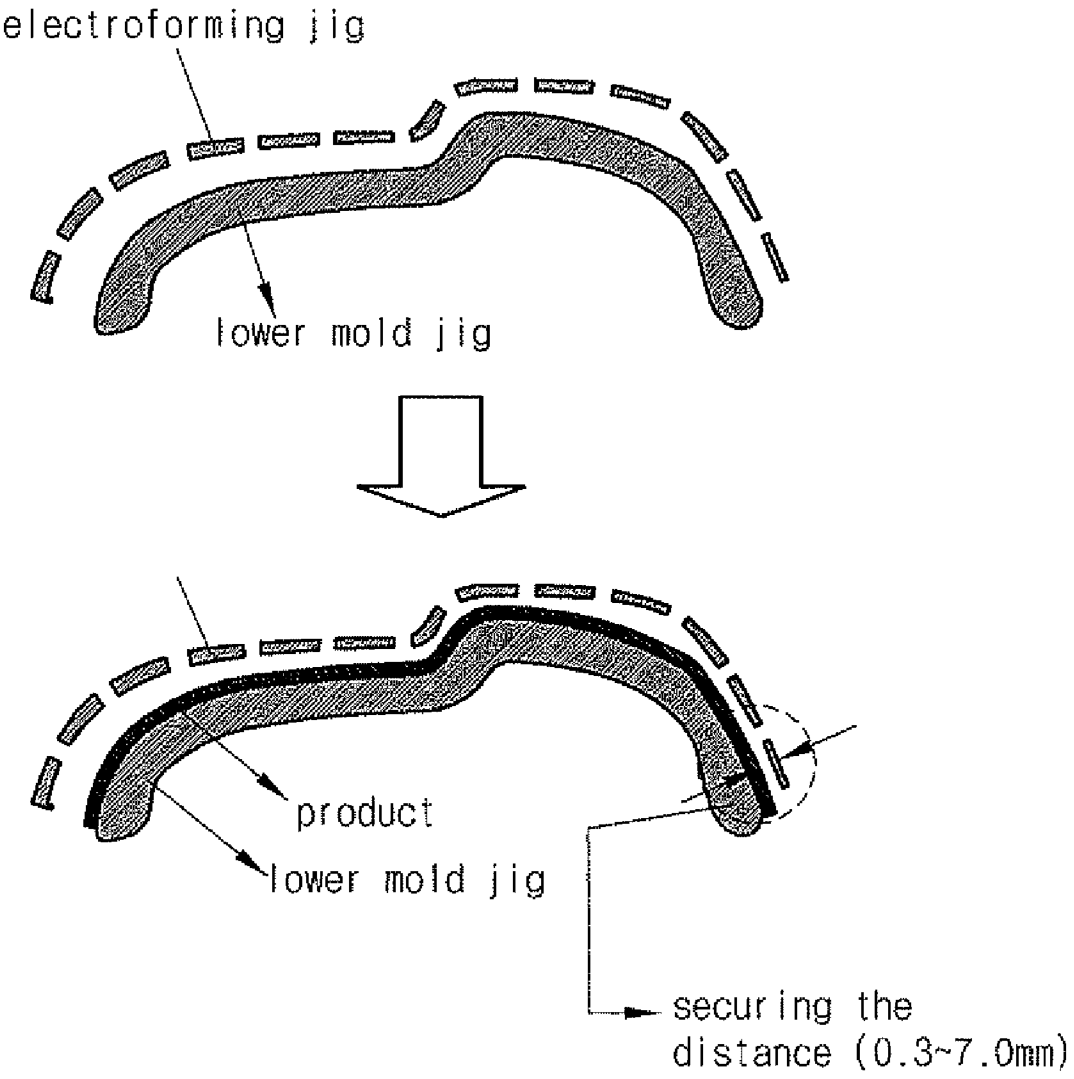
FIG. 6 is a schematic view showing an example of the use of an electroforming jig formed with a mask according to the present invention.
Figure 7:
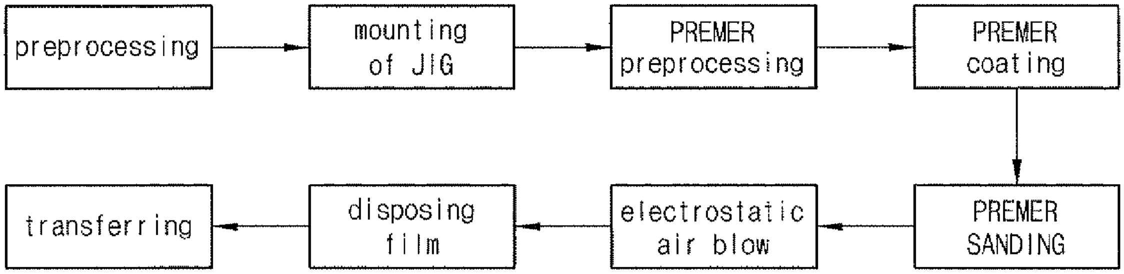
FIG. 7 is a process flow view showing a process of shaping a pattern on a conventional product.

FIG. 1 is a process flow view showing an etching process in a method of fabricating a mask for forming wood grain patterns in accordance with the present invention, FIG. 2 is a process flow view showing a pattern sheet forming process in a method of fabricating a mask for forming wood grain patterns in accordance with the present invention, FIGS. 3 to 5 are process flow views showing an electroforming process in a method of fabricating a mask for forming wood grain patterns in accordance with the present invention, and FIG. 6 is a schematic view showing an example of the use of an electroforming jig formed with a mask according to the present invention.

According to the present invention, a pattern sheet having a pattern thereon is manufactured through an etching process, and an electroforming process is carried out on an arbitrary stereoscopic object (product) using the pattern sheet to produce a mask so that a natural and elaborate pattern can be shaped on the arbitrary stereoscopic object (product).

In order to perform a smooth work, first, a pattern is selected, and then design work and microanalysis of the selected pattern are performed.

Also, a desired pattern is machined or processed on a metal plate or a roll through the etching process, and a flexible sheet is pressed on the metal plate to process a pattern sheet. Thereafter, a mask is processed through an electroforming process, and the mask and a product are assembled together to shape the pattern with a distance defined therebetween.

In addition, a mold is processed to have a depth of 1-300 μm therein using the mold for producing a product and the etching process, so that a product of a basic form used during the electroforming process is provided.

More specifically, the pattern which a user wants to have is selected and designed before the etching process is performed, and a film shaped according to the selected pattern is fabricated and prepared. After the pattern sheet has been processed, a previous test is carried out to identify and examine the pattern.

Also, as shown in FIG. 1, an etching process is performed on a metal plate.

The etching process is performed on the metal plate in such a fashion that a prepared metal plate is subjected to a resist coating to form a coating layer, a film shaped according to the selected pattern is attached to the top surface of the coating layer formed on the metal plate, and an ultraviolet (UV) ray is irradiated to the metal plate attached with the film using an ultraviolet lamp device.

Then, as shown in FIG. 1 (fifth step), a part of the coating layer is left according to the pattern shape of the film, and then a resultant metal plate is immersed into an etching solution.

If a part of the metal plate partially removed of the coating layer is etched according to the selected pattern, the coating layer is completely removed and then the metal plate is sanded to be processed in a shape as shown in FIG. 1 (seventh step).

In the above etching process, an etching depth is preferably set to a depth for minimizing the deformation of the mask. Preferable etching depth is 0.12-3.5 mm.

In a method of interconnecting a figure and a figure constituting a pattern together with elaboration of the shape of the selected pattern, the metal plate is preferably etched in the form which is elaborate to the extent so as not to affect the pattern shape at the time of coating a paint.

In the meantime, in order to form the selected pattern on a three-dimensional stereoscopic object, a flexible sheet is pressed on the surface of the metal plate as etched above to thereby produce a pattern sheet as shown in FIG. 2.

At this time, the flexible sheet being used has, preferably, a thickness of 0.15-5.0 mm which is greater than the etching depth, and is made of a material such as PVC, polyurethane, silicone and the like.

The shape and depth of the pattern can be changed during the production of the pattern sheet. Thus, a material of which the flexible sheet is made is preferably maintained at a proper temperature to prevent or minimize the change in the shape and depth of the pattern.

Also, preferably, the pattern sheet is designed such that when a paint is coated on the pattern sheet, a distance is maintained between the pattern sheet and the product. Since the pattern sheet is attached to the product, it is preferably made of a material suitable for it.

In addition, the pattern sheet is preferably processed in such a fashion that when it is attached to a desired product, a change of the shape of the pattern sheet is minimized.

Next, a surface treatment is performed on the surface of a model, a plastic injection molding product or the like. Also, whether or not the pattern sheet is produced to have a thickness of 0.12-3.5 mm is tested, and then the pattern sheet is attached to the surface of the product.

If the pattern sheet is too much thick, it is not attached to the product well. On the contrary, if the pattern sheet is too much thin, there occurs a deformation of the shape thereof. Thus, the pattern sheet is produced to have a thickness of 0.12-3.5 mm or so in order to minimize separation thereof from the product and deformation of the shape of the pattern during the attachment thereof to the product.

Further, the pattern sheet is preferably designed to enable to serve to define a formation range of the pattern and reinforce the pattern. The pattern sheet attached to the product is subjected to an electrical conduction treatment for the purpose of electrodeposition to coat a silver solution thereon.

At this time, the silver solution is uniformly coated on the surface of the pattern sheet. If the silver solution is ununiformly coated on the surface of the pattern sheet, a portion of the surface of the pattern sheet which is not perforated is partially processed and a measure is taken to prevent a portion for reinforcement from being unnecessarily increased.

In the present invention, the pattern sheet is produced to have a thickness of 0.12-3.5 mm, but the thickness thereof may be adjusted depending on the condition and situation of each work.

Meanwhile, the top end portion of the electrical conduction-treated pattern sheet is polished and is subjected to a release coating as shown in of FIG. 3 (fourth step). As shown in FIG. 3 (fifth step), a masking is performed on the portion except the portion on which the electrodeposition is performed.

Subsequently, as shown in FIG. 4, if current is applied to the product at an anode and current is applied to nickel pellets at a cathode while the product is immersed into an electroforming solution, nickel ions of the nickel pellets are transported to the product and are electrodeposited on the electrical conduction-treated portion of the product through the electroforming solution to thereby form an electrodeposited layer on the pattern sheet coated with the silver solution and the product as shown FIG. 5 (first step).

The electrodeposited layer may be made of a metal such as iron, chrome or the like besides the nickel, as well as a light metal.

Then, as shown in FIG. 3 (fifth step), the electrodeposited layer is removed from the product and the pattern sheet coated with the silver solution to thereby form an electroforming jig while paying attention to minimization of deformation of the shape of the product.

A perforated mask is formed on the electroforming jig, and the electroforming jig is formed to have a thickness of 0.12-5.0 mm or so. According to the present invention, the mask is fabricated to have a thickness of at least 0.15 mm, and the thickness of the mask may be in the range between 0.1 mm and 10.0 mm.

The electroforming jig on which the mask is formed is assembled to a lower mold plate having a fixing pin for fixing the mask, and the product is securely fixed to a lower mold jig, such that natural patterns such as wood grain patterns are shaped by preventing a paint from running down during the painting.

The lower jig is fabricated for the purpose of modification of the shape of a partial pattern and partial microprocessing of non-perforated portion(s) of the mask.

In addition, as shown in FIG. 6 (second step), the product is securely fixed to the lower mold jig in a state where a distance between the product and the electrodeposited layer is secured to thereby shape the selected pattern.

The distance between the product and the electrodeposited layer is secured in a range of 0.3-7.0 mm or so, and the pattern insufficiently shaped on the product is adjusted so as to enhance the quality of the product.

A work required for installing a grip, etc., on the mask according to the present invention or a reinforcing work is carried out under the condition where deformation of the pattern does not occur.

Further, it is preferable that the mask is assembled such that deformation of the pattern is prevented to conform to the shape associated with the position setting of the mask and the product is smoothly controlled upon the assembly of the mask. The distance and the position of the mask can be adjusted according to formation of the pattern on the product. Moreover, the shape and the number of masks can be determined so as to facilitate the washing of a paint or in consideration of the injection angle of the paint.

As described above, the method of fabricating a mask for forming wood grain patterns according to the present invention has advantageous effects in that a desired shaped pattern is freely implemented on the surface of a product, and the manufacturing cost is relatively reduced and environmental pollution is minimized so as to naturally and actually express the texture of the product surface as compared to a conventional method in which the equipment cost and the management cost are dramatically increased.

The invention has been described in detain with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of fabricating a mask for forming wood grain patterns, which comprises the steps of:

subjecting a metal plate to an etching process to form a selected pattern on the metal plate and thereby provide an etched metal plate;

pressing a flexible sheet on the etched metal plate to transfer the selected pattern from the etched metal plate to the flexible sheet and removing the flexible sheet from the metal plate to form a pattern sheet;

attaching the pattern sheet to a surface of a product; and subjecting the product to an electroforming process to thereby fabricate the mask.

2. The method of claim 1, wherein the metal plate is etched by 0.12-3.5 mm.

3. The method of claim 1, wherein the flexible sheet has a thickness of 0.15-5.0 mm.

4. The method of claim 1, wherein the flexible sheet is made of at least one selected from the group consisting of PVC, polyurethane and silicone.

5. The method of claim 1, wherein the produced pattern sheet has a thickness of 0.12-3.5 mm.

6. The method of claim 1, wherein the mask is fabricated to have a thickness of 0.15 mm or greater.

7. The method of claim 1, wherein the etching process comprises the steps of:

subjecting the metal plate to a resist coating to form a coating layer;

attaching a film shaped according to the selected pattern to the top surface of the coating layer formed on the metal plate;

irradiating an ultraviolet (UV) ray to the metal plate with the film attached thereto;

immersing the metal plate into an etching solution to etch the immersed metal plate; and sanding the etched metal plate.

8. The method of claim 7, wherein the metal plate is etched by 0.12-3.5 mm.

9. The method of claim 1, wherein the electroforming process comprises the steps of:

attaching the produced pattern sheet to the surface of the product;

subjecting the attached pattern sheet to an electrical conduction treatment;

polishing the top end portion of the electrical conduction-treated pattern sheet and performing a release coating on the polished pattern sheet;

performing a masking on the remaining surface except the surface of the product to which the pattern sheet is attached;

subjecting the masked product to an electroforming to form an electrodeposited layer on the surface of the electrical conduction-treated pattern sheet; and removing the electrodeposited layer from the electrical conduction-treated pattern sheet to form an electroforming jig.

10. The method of claim 9, wherein the electrical conduction treatment comprises coating a silver solution on the pattern sheet attached to the surface of the product.

11. The method of claim 9, wherein a metal or light metal is electrodeposited on the pattern sheet in the electroforming process.

12. The method of claim 11, wherein the metal includes at least one of nickel, iron, and chrome.

13. The method of claim 9, wherein the electroforming jig is formed to have a thickness of 0.12-5.0 mm.

* * * * *